Nov. 12, 1968     H. WUTZEL     3,410,692
CONTINUOUS MANUFACTURE OF PRE-DOUGH
Filed Sept. 29, 1967
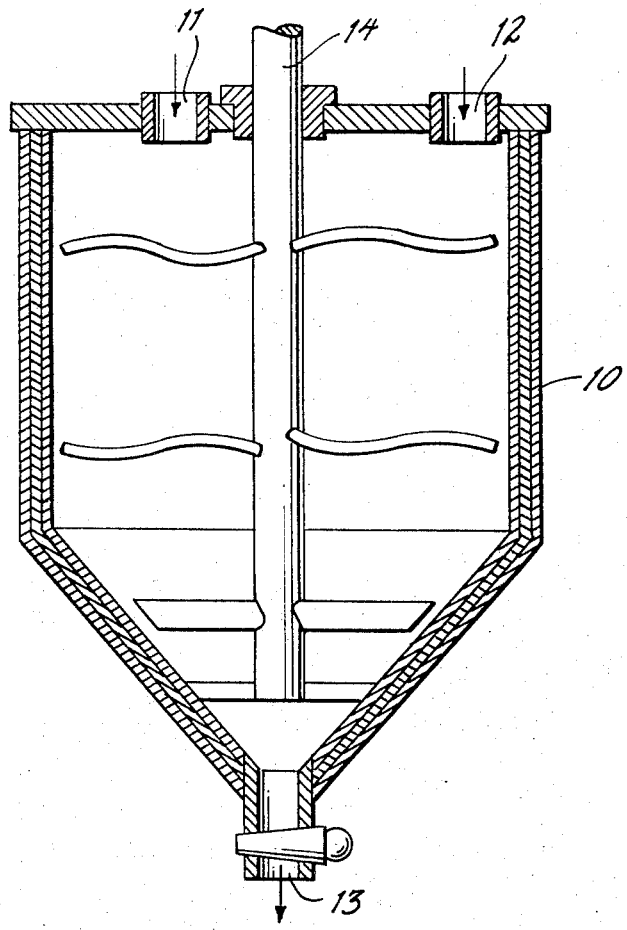
INVENTOR.
HERBERT WUTZEL
BY
ATTORNEY.

United States Patent Office 3,410,692
Patented Nov. 12, 1968

3,410,692
CONTINUOUS MANUFACTURE OF PRE-DOUGH
Herbert Wutzel, Vienna, Austria, assignor to Patentauswertung Vogelbusch Gesellschaft m.b.H., Vienna, Austria, a company of Austria
Continuation-in-part of application Ser. No. 236,735, Nov. 9, 1965. This application Sept. 29, 1967, Ser. No. 671,816
Claims priority, application Austria, Nov. 14, 1961, A 8,583/61; Oct. 1, 1962, A 7,778/62
25 Claims. (Cl. 99—90)

ABSTRACT OF THE DISCLOSURE

A process for making a pre-dough or starting dough ferment for making dough in which, while pre-dough components are being fermented, there are added repeatedly microorganisms free of culture medium selected from the group comprising lactic acid-forming bacteria and yeasts, throughout the entire course of the fermentation of the pre-dough components. The pre-dough ferments such as leaven are suitable for being mixed with flour for making them into a dough, and then baking this dough to excellent bread and baker's wares of optimal properties.

---

This patent application is a continuation-in-part of application Ser. No. 236,735, filed Nov. 9, 1965, now abandoned.

The present invention relates to a process of carrying out continuous pre-dough fermenting operations, particularly leaven fermenting operations, for making bread and pastry or baker's wares, respectively.

The oldest and best-known process of making bread and pastry or baker's wares which is used for making bread even today, is based on a multi-stage leaven fermenting operation. This so-called indirect or long leavening process takes about 24 hours. The leavening time can be reduced substantially if carrying substances, such as swelling flours, called "dry leaven," which contain leaven fermentation products, such as lactic acid and acetic acid, together with compressed yeast are used rather than leaven for preparing a dough. Whereas this method of leavening, which is called direct or short-time leavening, takes only about three hours, the resulting bread compares generally less favorably in taste, consistency, and durability with bread produced with leaven. A considerable improvement in the properties of the products made by short leavening can be achieved if the leavening agent consists of a mixture of yeast and acid-forming bacteria separated from the culture medium, such as lactic acid bacteria or leaven bacteria. Said mixture is characterized by containing at least 15%, preferably 20% or more, by weight, of live bacteria mass per 100%, by weight, of compressed yeast, based on equal dry weights of the compressed yeast and the bacteria mass, said mixture having a water content of about 70% to 80%, by weight.

Whether these previously discussed processes are based on indirect or direct leavening, they are all discontinuous processes, in which the amounts of leavened dough required in each case must be freshly prepared so that fresh batches, which are highly restricted in quantity by the installation used, must be made each time. This is very time consuming.

Most recently, processes have been developed with the object of enabling continuous leaven fermenting operations. In one of these processes, a plurality of leaven containers suspended side by side in a circuit from a rotating ring member, are fed with the ingredients required for making leaven. Then the rotating ring is caused to rotate. After a single revolution of the rotating ring, which takes, for instance, about five hours, the filled leaven containers of this container system return to their initial position and the contents of each container is drained into a container of a second container system, which is similar to and arranged under the first one. In the lower containers, flour and water are added to the leaven filled thereinto and the same procedure as with the upper container system is repeated with the lower one, with the difference that larger amounts of pre-dough are involved. After one revolution of the lower container system, the leaven, which is now mature, is introduced into the dough mixing and kneading machine. This process can be called a partly discontinuous and partly continuous process. It requires considerable equipment and is rather complicated. In this process, the leaven output can be increased only when steps are taken to promote bacterial growth. In practice, this can be effected only by an increase in temperature, which may readily result in a disturbance of the biological equilibrium of the bacteria. For this reason such a process can be used only with caution and on a restricted scale. This is due to the fact that, when leaven fermentation is carried out at an elevated temperature to increase the output, the ratio of volatile acids, particularly acetic acid, to total acids formed in the pre-dough is changed considerably. This change greatly exceeds the change taking place when operating at a lower temperature. Thus at a higher temperature the proportion of volatile acid in the pre-dough is substantially reduced so that the taste of the finished products is markedly deteriorated. This is due to the fact that the ratio of volatile acids to total acids which is a result of biological conditions, is an essential prerequisite for the formation of aroma and taste in finished bread and pastry or baker's wares.

Compared to this last-mentioned process, a process which has been disclosed more recently and has been described as "silo" process, represents an advance in this art inasmuch as apparatus requirements are reduced considerably and thus the procedure is simplified. In the silo process, a container is used which contains a mass of fermenting pre-dough before the beginning of the actual continuous process. Flour and water are continuously added to this mass of pre-dough and at the same time leavened substrate is withdrawn therefrom at such a rate that quantity, concentration, bacterial count, and acid content of the mass of pre-dough remaining in the container remain unchanged. However, even when proceeding in this manner, an increase in the leaven output can be achieved only by promoting the bacterial growth. This can practically be done only by a temperature increase. Thus this process also has all the disadvantages mentioned hereinabove with respect to such an increase in temperature. Although it has been proposed to achieve an increase in bacterial growth in the silo process by the addition of calcium carbonate and vitamin yeast, such an addition has not proved of advantage, because the baked products were not satisfactory. Likewise, an addition of sodium phytate resulted to a certain extent in an increase in the number of bacteria, but the properties of such a phytate bread did not fulfill all the requirements to be met. Other difficulties arise in an embodiment of said "silo" process insofar as the pre-dough (sour dough) obtained is continuously fed from the container into a continuous mixer, and this continuous feeding must be controlled either by volume or weight; it is therefore necessary to take precautions against yeast fermentation in the container, in order to prevent a change of the specific weight of the pre-dough fed from the container into the mixer (cf. for instance "The Bakers Digest," April, 1954).

In U.S. Patent 3,216,908 there is described a method for a continuous production of leaven according to which water and flour are mixed with matured leaven, and this mixture is introduced into the void lowermost compartment of a cylindrical fermentation chamber which is divided by means of fixed partitions into individual compartments. Then this mixture is moved without any additions from the lowermost compartment into the next higher compartment, which is likewise void, and thereafter, also without any additions, through all the following void compartments, thereby maturing into leaven. The matured leaven is finally withdrawn from the uppermost compartment of said cylindrical fermentation chamber. U.S. Patent 3,125,968 is concerned with the manufacture of bread dough from fermented brew, which is produced continuously. "Cereal Chemistry," January, 1959, discusses the usual discontinuous production of brews for addition to flour to give doughs suitable for baking. None of the literature discloses the distinguishing aspects of the process of the invention, nor the improvements obtained herewith.

It is one object of the present invention to provide a process of continuously carrying out leaven fermentation whereby the disadvantages encountered in the above-mentioned known continuous processes due to difficulties in controlling bacterial growth and, consequently, in increasing the output and in reducing the apparatus requirements, are voided. This new process also permits proper adjustment of the properties of the finally resulting baked products by suitable selection of the used bacteria.

Furthermore, it is an essential object of the present invention to provide a process of carrying out continuous pre-dough fermentation of any type including operations without leavening, which process is extremely simple, can be controlled very readily, and permits the production of a fermenting pre-dough which may be used for making bread and pastry or baker's wares of excellent properties with considerably reduced apparatus requirements, even when starting with wheat flour.

Other objects of the present invention and advantageous features thereof will become apparent as the description proceeds.

The figure is a schematic longitudinal section through an apparatus for the making of the pre-dough.

The process of the invention is directed to the manufacture of a pre-dough or ferment which is suitable for being used as a starting dough or ferment for making dough. Thus the process concerns the manufacture of a ferment prior to the manufacture of the dough from which baked bread is directly made. In particular, the ferment prepared in accordance with the invention can be leaven or sour dough, or a yeast-fermentation starter comprising either mixtures of yeast, wheat flour and water, usually called "sponge," or yeast-activated liquids, usually called "brews." The ferment obtained as a result of the process of the invention can, in accordance with some embodiments of the invention, be prepared into a dough by addition of unfermented dough components, then baked. The ferment obtained in accordance with the invention is remarkably well suited by its combination of desirable properties for making superior baked products. The process of the invention, in contrast to other methods, is characterized by being a homogeneous system, preferably single-phase homogeneous system. For an easier understanding of the invention it may be elucidated that in the system of the invention, during steady-state continuous operation, all the micro-organisms in the system are growing under the same environmental conditions which do not change with time; all the cells within the system at all times will therefore, statistically, be in the same physiological state. This is in contrast to a heterogeneous system in which, on the other hand, microorganisms in different parts of the system are exposed to different environments, will have had different histories and will be in different physiological states. Microorganisms passing through a heterogeneous system will undergo something akin to the "growth" of a batch culture. This constitutes a very important difference between the two systems.

Moreover, the system of the invention is characterized by being an "open" system insofar as microbial cells continuously emerge in the effluent, in contrast to closed systems wherein the cells are wholly retained within the system or are continuously returned to it by re-cycling.

The process of the invention comprises adding in a multiplicity of increments, lactic acid-forming microorganisms free of culture medium repeatedly to fermenting pre-dough components throughout the course of their fermentation. During the course of the fermentation, the various stages of fermentation within the fermenting pre-dough components are maintained statistically homogeneous throughout all units of volume of the fermenting pre-dough components. It is an aspect of the process of the invention that the acidity level of the dough obtained from the fermenting pre-dough is maintained substantially constant and high and that the pH values are kept substantially constant and desirably low during the entire course of the bread-making.

It has been found in accordance with the invention, that all these advantages are achieved by using the microorganisms required for the fermentation process, especially lactic acid-forming bacteria, after separation and isolation from the culture medium and by introducing, after fermentation of the pre-dough has been initiated, such separated and isolated microorganisms into the fermentation vessel in a predetermined manner as the fermentation proceeds.

The microorganisms used in accordance with the process are free of culture medium, that is, the medium wherein the fermentative microorganism is initially propagated or the medium, liquid or not, that would sustain its growth prior to addition to the fermentation process.

In accordance with the process of the invention of carrying out continuous pre-dough fermenting operations, especially leaven fermenting operations, for making bread and pastry or baker's wares, the ingredients required for preparing the pre-dough are continuously added to a batch contained in the fermentation apparatus, while corresponding quantities of pre-dough are continuously withdrawn from the apparatus. Further, microorganisms separated and isolated from their culture medium, especially lactic acid-forming bacteria, are continuously introduced into the fermentation apparatus during fermentation of the components. In accordance with the invention, it is most desirable to admix the portions of microorganisms repeatedly within every hour span to the fermenting components.

The microorganisms used in this process are lactic acid-forming bacteria and yeasts, such as yeast of the genus *Saccharomyces cerevisiae* usually employed for baking purposes. The lactic acid-forming bacteria employed in this process may be homofermentative bacteria as well as heterofermentative bacteria, especially lactic acid bacteria or leaven bacteria, such as *Lactobacillus plantarum* and *Lactobacillus brevis*.

The term "bread and pastry or baker's wares" as used in the specification and the claims annexed thereto includes all products of this type, especially those based on rye, wheat and mixtures thereof.

The term "continuously" as used in the specification and the claims annexed thereto includes in connection with the invention adding or withdrawing also in several portions, i.e. intermittently. As a result of the feature that in the process according to the present invention the microorganisms are introduced into the fermentation vessel continuously, i.e. in any case repeatedly, so that their introduction takes place at several moments and is distributed virtually throughout the entire fermentation process, the output can be increased substantially. In accordance with the invention, the desired biological conditions are maintained so that the fermentation is characterized by the proper biological conditions, proportion of volatile acids in the dough, so that suppression of or reduction in activity of the aroma-forming bacteria can reliably be prevented even in fermenting operations taking a very long time. Further, in accordance with the invention and in a further distinguishing aspect thereof, the stages of fermentation of the fermenting components, such as leaven components, are maintained statistically the same throughout all units of volume of the fermenting components. In the embodiment using yeast, its terminal activity is found to be desirably over 50 and more preferably over 70.

The method of the invention permits carrying out the fermentation at normal or elevated temperature and to control aroma and other properties of the bread and pastry or baker's wares in any desired manner within wide limits. Thus when proceeding according to the present invention, for instance by adding at different occurrences different types of the desired microorganisms, the lactic acid-forming bacteria can be selected in dependence on the desired aroma of the bread and pastry or baker's wares, and especially in dependence on the desired proportion of volatile acids in such products. All these possibilities are not available when proceeding according to previously known processes of carrying out leaven or other fermenting operations because the microorganisms are added only once in such known processes at the beginning of the fermentation in order to initiate the same.

In making pre-dough for rye bread and mixed rye-wheat bread by the process according to the present invention, preferably the proportion of heterofermentative bacteria is increased in the fermenting pre-dough when there is an increase in the fermentation temperature, whereby these bacteria are used predominantly or exclusively, i.e. alone. In making such types of bread, heterofermentative bacteria should be used at least predominantly, i.e. in predominant quantities or exclusively in the fermenting pre-dough, especially if the fermentation temperature is 35° C. or above.

On the other hand, mainly homofermentative bacteria are used with advantage in making pre-doughs for bread or pastry and baker's wares from wheat by leaven fermentation. Yeasts together with lactic acid-forming bacteria, especially with homofermentative bacteria, may also be used as microorganisms and may be intermittently or continuously added to the fermentation vessel. In making bread and pastry or baker's wares from wheat, it is also possible to carry out the process without leaven fermentation by using yeasts as microorganisms in the absence of acid-forming bacteria and by introducing such yeasts intermittently or continuously into the fermentation apparatus for making the pre-dough.

When preparing doughs for making bread and pastry or baker's wares from wheat by means of yeast, it is also possible to use fermentation starters which contain no flour or relatively small amounts of flour; such fermentation starters are known under the designations "brew," "liquid ferment" or "yeast-activated liquid." They contain between about 0.5% and about 8% of yeast, calculated for the total amount of flour used for making the entire dough, i.e., including the amounts of flour which are added subsequently, and other dough ingredients such as, for instance, water, sugar, dry milk, malt, salt, and auxiliary baking agents.

In accordance with the invention, the lactic acid-forming bacteria are introduced into the fermentation apparatus in a total amount up to about 3.0% (based on a dry content of the bacteria of 30%) calculated for the amount of flour to be processed. The amount of up to about 3.0% is added regardless whether the lactic acid-forming bacteria are used alone or together with yeast. Said bacteria are preferably introduced into the fermentation apparatus in an amount corresponding to the following equation: $a/k=$ between 0.5 and 10.0. In said equation $a$ is the amount of bacteria in percent, $k$ equals $q/v$, whereby $q$ is the amount of flour, in g., charged per hour, and $v$ is the amount of flour, in g., contained in the fermentation vessel. Commercially available baker's yeast having a dry content of about 30% is usually employed.

The advantages of the invention are obtainable even though as illustrated in the examples the total amount of microorganisms used can be more limited than that used in accordance with the prior art, such as the silo process. Moreover, the process of the invention is more efficient than processes of the prior art. With the same total amount of bacteria or yeasts, there is produced in accordance with the process of the invention, per unit of time, a greater amount than is conventionally obtainable according to the known art, of ferment sufficiently and satisfactorily acidic and fermented to be used in making the dough.

For carrying out continuous fermentation of pre-dough according to the present invention, only one vessel, which can be closed, is sufficient. As known with respect to apparatus used in this field, this vessel may suitably have a cylindrical shape or, if desired, a downwardly tapering shape. It is provided with means for introducing the microorganisms, means for adding the ingredients required for preparing the pre-dough, means for discharging the resulting pre-dough, an agitating device, if desired also an aeration device, and means for measuring and controlling the desired temperature. This vessel which is not compartmentalized represents the entire fermentation apparatus, and it alone is sufficient for carrying out the fermentation process according to the present invention. If desired, one or several after-fermentation vessels may be arranged subsequently to the fermentation apparatus although this is hardly necessary; this is at least not necessary when using pre-doughs for preparing doughs for making bread and pastry or baker's wares from wheat with the aid of yeast.

It is a characteristic of the invention that in the process, the fermenting components are not physically moved from one compartment or container to another, the only physical movement of the fermenting components being limited to within the container, as by stirring, and removal therefrom of the finished product.

As shown in the figure, the fermentation container 10, has a suitable inlet 11 for solid pre-dough unfermented ingredients and inlet 12 for liquid components, the microorganisms can be introduced at either or both inlets. At the other end of the container which is not divided into compartments, outlet 13 is provided for the removal of the ferment, and means 14 are the mixing means. The container is suitably insulated and heated or cooled, if necessary by conventional means, not shown, to provide the suitable fermentation temperature.

In the process according to the present invention, fungicidal microorganisms such as propionic acid bacteria, may be admixed in addition to the lactic acid-forming bacteria and/or yeasts which effect fermentation. Their presence prevents, for instance, mold formation in the baked bread and pastry or baker's wares.

The process according to the present invention and its modifications may be continued without interruption for any desired length of time. The fermentation may be terminated in a simple manner by gradually reducing the rate at which the ingredients required for preparing the pre-dough are continuously fed to the fermentation apparatus, or by completely discontinuing feeding of said ingredients and/or by increasing the rate at which the pre-dough is withdrawn from the fermentation apparatus within a predetermined unit of time. Although fermentation could be carried out in this manner throughout its entire duration thereof, such a procedure certainly would be substantially less efficient than the continuous process.

The present invention will be explained more in detail in the following non-limiting examples. Example 1, parts (a) and (b), does not relate to the process according to the invention but to the above-mentioned known silo process. This example serves to compare the results obtained by continuous leaven fermentation for making rye bread by the silo process, on the one hand, with the process according to the present invention, on the other hand, the results achieved thereby being given in Example 2.

EXAMPLE 1(a)

A container of 12 l. capacity provided with an agitating device and with heating and cooling means is charged with 1,600 g. of rye flour Type 1150, 1,600 cc. of tap water of a temperature of 35° C., and 800 cc. of a rye flour mash prepared in known manner with heterofermentative lactic acid bacteria with an addition of calcium carbonate, corresponding to an amount of 8 g. of bacteria having a dry content of 30%. To initiate fermentation, this mixture is held at a temperature of 28° C. for twelve hours without stirring. Thereafter agitation is started and the amount of pre-dough in the container is increased to 10,000 g. by adding 2,400 g. of rye flour Type 1150 and 3,600 cc. of water. After stirring for one hour the initial fermentation is over, and the actual continuous process or continuous fermentation begins. Continuous fermentation is effected at a temperature of 28° C. Leaven is continuously withdrawn from the bottom of the fermentation vessel at a rate of 2,000 g. per hour. Rye flour Type 1150 is continuously supplied to the fermentation apparatus at a rate of 800 g. per hour and water at a rate of 1,200 cc. per hour.

To compare leavens continuously obtained in this manner after six hours and after twelve hours, respectively, 400 g. of leaven are withdrawn after such fermentation times. The discharged leavens are subjected to after-fermentation at 28° C. for three hours and are then mixed with 240 g. of rye flour Type 1150 and 20 cc. of water, containing 4 g. of yeast and 7 g. of common salt to form a bread dough which is then shaped. The resulting loaves are baked in an oven after a loaf leavening time of about 40 minutes. On testing the two types of bread on the next day, they have a pH value of 4.7 and 4.8, respectively, and an acidity of 7.3 and 6.8, respectively. Both breads are unsatisfactory especially with respect to their crumb elasticity. While the taste of the first bread (leaven fermentation for six hours) may still be considered as mildly aromatic, the taste of the second bread (leaven fermentation for twelve hours) is somewhat flat and insipid.

EXAMPLE 1(b)

Part (a) is repeated with another batch of 1,600 g. of the same rye flour under the same conditions, with the exception that 2,400 cc. of tap water of a temperature of 35° C. are used, and adding initially 100.4 g. of bacteria of a dry content of 30%, no further amount of bacteria being supplied. Samples of leaven were removed from the fermentation at the times shown in the Table below. Breads made as shown above in part (a) had the following acidity and pH value:

| Hours | ¾ | 2¼ | 3¾ | 5¼ | 6¾ | 8¼ | 9¾ | 11¼ |
|---|---|---|---|---|---|---|---|---|
| Acidity | 9.3 | 8.6 | 7.8 | 7.2 | 6.8 | 6.4 | 6.2 | 6.2 |
| pH Value | 4.4 | 4.6 | 4.8 | 4.9 | 5.1 | 5.3 | 5.45 | 5.5 |

It is evident that the acidity decreased and the pH value increased during the course of the fermentation. The baked breads obtained from leaven removed after 3¾ hours and later were unsatisfactory in same points of view as in part (a).

EXAMPLE 2(a)

A container of the type described in Example 1(a) with a capacity of 12 l. which is provided with an agitating device and heating and cooling means is charged with 1,600 g. of rye flour Type 1150, 2,380 cc. of tap water of a temperature of 35° C. and 24 cc. of a paste of heterofermentative lactic acid bacteria, of a dry content of 10%, corresponding to an amount of 8 g. bacteria of a dry content of 30%. To initiate fermentation, the mixture is kept at a temperature of 28° C. for twelve hours without agitation. Thereafter, stirring is started and the amount of pre-dough is increased to 10,000 g., as in Example 1(a), by adding 2,400 g. of rye flour Type 1150 and 3,560 cc. of water thereto. In contrast to Example 1(a), 36 cc. of a paste of heterofermentative lactic acid bacteria of a dry content of 10%, corresponding to 12 g. of bacteria of a dry content of 30%, are added. After stirring for one hour, the initial fermentation is finished and the actual continuous fermentation, i.e. the continuous process, sets in at a fermentation temperature of 28° C. Leaven is withdrawn at a rate of 3,340 g. per hour, compared to 2,000 g. per hour as in Examples 1(a) and 1(b), and 1,340 g./hour of rye flour Type 1150, 1,980 cc./hour of water, and 20 cc./hour of a paste of heterofermentative lactic acid bacteria of a dry content of 10%, corresponding to 6.7 g. of bacteria of a dry content of 30% are fed into the fermentation vessel. The total amount of bacteria added during initial fermentation and in 12 hours of continuous fermentation is 100.4 g., thus the same as that added initially in Example 1(b). The ratio of the amount of bacteria in percent divided by $k$ is 1.49.

In order to obtain results comparable with those of the procedure according to Example 1(b), leavens obtained after continuous fermentation for 6 hours and for 12 hours, respectively, are subjected in amounts of 400 g. each to after-fermentation at 28° C. for three hours, as described in Example 1. The leavens are then mixed with 240 g. of rye flour Type 1150 and 20 cc. of water containing 4 g. of yeast and 7 g. of common salt to form a bread dough, which is molded. The resulting loaves are baked in an oven after a loaf leavening time of about 40 minutes. On testing the two types of bread the following day, a pH-value of 4.5 and 4.45, respectively and an acidity of 8.6 and 9.0, respectively, were found. In both types of bread, the elasticity of the crumbs is very good and aroma and taste are strong and pure.

The test results prove that when proceeding according to the invention, the biological conditions and, in particular, pH and acidity values remain apparently essentially unchanged even on prolonged fermentation so that the growth of the aroma-forming bacteria is not suppressed although leaven formation is 167% of that achieved on proceeding according to Examples 1(a) and (b) and calculated for a vessel content as required for an output of 1,000 g. per hour.

EXAMPLE 2(b)

Part (a) is repeated, adding a total amount of bacteria of 100.4 g. in portions during the fermentation, i.e. during the initial and the continuous fermentation. Samples of leaven were removed from the continuous fermentation after times of ¾, 2¼, 3¾, 5¼, 6¾, 8¼, 9¾, and 11¼ hours. Breads made as described above had pH values essentially between 4.4 and 4.5 and acidity values above about 8.6.

EXAMPLE 3(a)

A charge prepared as described in Example 2(a) in a container of the type mentioned in Example 1(a) is first allowed to stand for 12 hours in accordance with Example 2. 2,400 g. of rye flour Type 1150, 3,460 cc. of water and 144 cc. of a paste of heterofermentative lactic acid bacteria of a dry content of 10%, corresponding to 48 g. of bacteria of a dry content of 30% are admixed thereto. After stirring for one hour, the actual continuous fermentation process sets in whereby leaven is withdrawn at a rate of 5,000 g. per hour and rye flour Type 1150 is introduced into the fermentation vessel at a rate of 2,000 g. per hour, water at a rate of 2,900 cc. per hour, and a paste of heterofermentative lactic acid bacteria of a dry content of 10% at a rate of 120 cc. per hour which corresponds to a rate of 40 g. per hour of bacteria of a dry content of 30%. The temperature is maintained thereby at 28° C.

The total amount of bacteria added in 12 hours is 480 g. and the total amount of bacteria introduced from the beginning is 536 g. The ratio of the amount of bacteria in percent divided by $k$ is 4.0.

Bread baked from dough made as described hereinabove in Example 2 after continuous leaven fermentation of six hours and twelve hours, respectively, has a pH value of 4.4 and 4.4, respectively, and an acidity of 9.8 and 10.5, respectively. In both types of bread, the elasticity of the crumbs is very good and aroma and taste are extremely strong and pure.

When proceeding in this manner, there is also apparently no detrimental change of the ratio of lactic acid to acetic acid although the increase in output compared with that achieved by proceeding as set forth in Example 1, is 250%. Due to a pH value of 4.4 of such bread a perfectly elastic crumb is achieved even when rye flour is used which has been highly damaged by sprouting.

EXAMPLE 3(b)

The procedure of Example 1(a) is repeated, a total amount of 536 g. of bacteria being added initially before the continuous fermentation takes its course. The amount was thus greater than in Example 1(b). The pH and acidity values of baked breads obtained from leavens as described above are reported in the table below.

| Hours | ¾ | 2¼ | 3¾ | 5¼ |
| --- | --- | --- | --- | --- |
| Acidity | 9.3 | 7.3 | 6.2 | 5.5 |
| pH values | 4.5 | 5.0 | 5.8 | 6.1 |

The baked products obtained from the leavens removed at 2¼ hours and thereafter were unsatisfactory.

EXAMPLE 3(c)

Part 3(a) is repeated determining pH and acidity values at the intervals stated in Example 2(b). The pH of the baked products remained essentially constant at 4.4 and the acidity remained constant at about 10.

EXAMPLE 4

A container of the type described in Example 1 is charged with 1,600 g. of rye flour Type 1050, 2,380 cc. of tap water of 40° C., and 24 cc. of a paste of heterofermentative lactic acid bacteria of a dry content of 10%, corresponding to 8 g. of bacteria of a dry content of 30%. To initiate fermentation, this mixture is kept at a temperature of 32° C. for twelve hours without agitation. Thereafter, stirring is started and the amount of pre-dough is increased to 10,000 g. by adding 2,400 g. of rye flour Type 1050, 3,380 cc. of water, and 216 cc. of a paste of heterofermentative lactic acid bacteria of a dry content of 10%, corresponding to 72 g. of bacteria of a dry content of 30%. After stirring for one hour, actual continuous fermentation starts whereby at a fermentation temperature of 32° C., leaven is withdrawn at a rate of 3,000 g. per hour. Rye flour Type 1050 is fed into the fermentation vessel at a rate of 1,200 g./hr., water at a rate of 1,790 cc./hr., and a paste of heterofermentative lactic acid bacteria at a rate of 108 cc./hr. corresponding to 36 g./hr. of bacteria of a dry content of 30%.

The ratio of amount of bacteria in percent divided by $k$ is 10.0.

Leavens obtained after continuous fermentation for 6 and 12 hours, respectively, are mixed, in amounts of 400 g. each and without after-fermentation, with 240 g. of rye flour Type 1050, with 4 g. of baker's yeast, and 7 g. of common salt, which are dissolved in 20 cc. of water, to form a bread dough, which is shaped into loaves. After a loaf leavening time of about 40 minutes, the loaves are baked in an oven. On testing the two types of bread the following day, a pH value of 4.6 and 4.55, respectively, and an acidity of 7.1 and 7.5, respectively, are found. In both types of bread, the elasticity of the crumb is good and the bread has a pure aroma and a mildly sour, pure taste.

EXAMPLE 5

A container of the type described in Example 1, of 12 l. capacity is charged with 2,000 g. of wheat flour Type 550, 40 g. of sugar, and 4,000 cc. of tap water of a temperature of 35° C. containing 60 g. of baker's yeast and 10 g. of homofermentative lactic acid bacteria of a dry content of 30%. This batch is kept at a temperature of 28° C. for three hours without agitation. Thereafter, stirring is started and continuous fermentation begins. The fermentation temperature is 28° C. Pre-dough is withdrawn from the fermentation vessel at a rate of 3,000 g. per hour, while wheat flour Type 550 is added at a rate of 1,000 g./hr., sugar at a rate of 20 g./hr., and water at a rate of 2,000 cc./hr., said water containing 30 g. of compressed yeast and 5 g. of homofermentative lactic acid bacteria.

The amounts of pre-dough withdrawn per hour are slightly lower than the amounts added per hour. This is due to the loss on fermentation.

The ratio of amount of bacteria in percent divided by $k$ is 1.0.

The pre-dough withdrawn from the container is subjected to after-fermentation at a temperature of 28° C. for one and a half hours. 3,000 g. portions of such pre-dough withdrawn after six hours and after twelve hours are mixed with 2,600 g. of wheat flour Type 550 and 55 g. of common salt. The resulting doughs are divided, each portion, into eleven pieces of equal size, shaped, and placed into dough molds. After loaf fermentation, bread is baked therefrom.

On testing such bread, pH values of 4.9 and, respectively, 5.0 are found. Elasticity of the bread and their firmness on cutting are excellent. Aroma and taste of the bread are full and pure.

EXAMPLE 6(a)

A container of the type described in Example 1 and of a capacity of 12 l. is charged with 2,000 g. of wheat flour Type 550, 40 g. of sugar, and 4,000 cc. of tap water having a temperature of 35° C. wherein 80 g. of baker's yeast are suspended. The mixture is kept at a temperature of 28° C. for one hour to initiate fermentation. Thereafter continuous fermentation begins. The temperature is 28° C. Pre-dough is withdrawn at the rate of 3,000 g./hr., while wheat flour type 550 is added at a rate of 1000 g./hr., sugar at the rate of 20 g./hr., and water at the rate of 2,000 cc./hr., the water containing 40 g. of compressed yeast.

The pre-dough withdrawn from the fermentation vessel is subjected to after-fermentation at a temperature of 28° C. for one hour.

EXAMPLE 6(b)

A container of the type described above is charged with 1,880 g. of wheat flour Type 550, 40 g. of sugar and 3,720 cc. of tap water having a temperature of 35° C. Compared with Example 6(a) the formula has been altered slightly to obtain the same consistency of the pre-dough. In contrast to Example 6(a), 480 g. of baker's yeast are suspended in the tap water of the initial charge. The mixture is kept at a temperature of 28° C. for one hour to initiate fermentation. Thereafter continuous fermentation begins and is carried out in the manner described in Example 6(a) with the modification that no further compressed yeast is added.

To compare yeast-activity in pre-dough, each hour 100 cc. of pre-dough is metered in a graduated cylinder thermostated at 35° C. and the growing volume is measured 30 minutes later. Yeast-activity is marked in percentage of the filled-in pre-dough, i.e. 100 cc. This method of measuring yeast activity in pre-dough and dough is commonly used and described by Schulz, A., Brot u. Geback 19., 61–65 (1965).

In part (b) the yeast activity dropped from a value of 150 to below 10 in 10 hours, the sharpest drop occurring during the first 5 hours. In part (a), the activity though lower initially remained essentially constant between 75 and 85.

On testing, the bread made as described hereinbefore in part (a), pH values of 6.4 and 6.2, respectively, are found. The elasticity of bread made from pre-dough withdrawn after 6 hours and after 12 hours is very good, their firmness on cutting is good to excellent, their taste is pure and slightly sweetish. The breads of part (b) of the example obtained from pre-doughs removed after 4 hours and thereafter were not satisfactory.

EXAMPLE 7

A container of the type described in Example 1, having a capacity of 12 l. is charged with the following pre-dough components.

|  | Grams |
|---|---|
| Water (temperature 32° C.) | 4,880 |
| Wheat flour | 916 |
| Sugar | 370 |
| Malt flour | 95 |
| Salt | 185 |
| Dried milk | 370 |
|  | 6,816 |

280 g. of yeast are added to said 6,816 g. of pre-dough components and the resulting batch of 7,096 g. is kept at a temperature of 30° C. for one hour to initiate fermentation while agitating. Thereafter, actual continuous fermentation begins. It is carried out at a fermentation temperature of 30° C. Pre-dough is withdrawn from the fermentation vessel at a rate of 2,840 g. per hour, while the following pre-dough components are fed to the fermentation vessel per hour:

|  | Grams |
|---|---|
| Water | 1,950 |
| Wheat flour (Type 550) | 458 |
| Sugar | 150 |
| Malt flour | 37 |
| Salt | 74 |
| Dried milk | 148 |
|  | 2,817 |

111 g. of yeast per hour are introduced into the fermentation vessel in addition to said 2,817 g. of pre-dough components intermittently or continuously so that the total feed per hour amounts to 2,928 g. The pre-dough mixture in the fermentation vessel is kept at a temperature of 30° C. while stirring. As is evident, the actually withdrawn amounts of pre-dough are slightly smaller than the amounts added. This is due to the loss occurring during fermentation.

In order to compare pre-doughs obtained after continuous fermentation for six hours and for twelve hours, respectively, the portions of pre-dough withdrawn per hour at said time, each amounting to 2,840 g., are mixed with 3,240 g. of wheat flour Type 550 and 130 g. of shortening to form a bread dough. Each of the resulting portions of bread dough is divided, without subjecting the dough to proofing, into twelve pieces of the same size which are shaped and placed into dough molds. After loaf fermentation, the breads are baked.

On testing such bread, pH values of 5.5 and 5.6, respectively, were found. The elasticity of such bread, its firmness on cutting and its aroma and taste are full and pure.

EXAMPLE 8

To produce a batch free of flour, the following pre-dough components are introduced into a vessel of the type described in Example 1, which has a capacity of 12 l. so as to initiate fermentation:

|  | Grams |
|---|---|
| Water (temperature 32° C.) | 4,880 |
| Sugar | 370 |
| Malt flour | 95 |
| Salt | 185 |
| Dried milk | 370 |
|  | 5,900 |

280 g. of yeast, i.e. about 4.7% are added to said 5,900 g. of pre-dough components so that the total batch amounts to 6,180 g. This batch is kept at a temperature of 30° C. for one hour to initiate fermentation while stirring. Thereafter, actual continuous fermentation begins, which is carried out at a fermentation temperature of 30° C. Pre-dough is continuously withdrawn from the bottom of the fermentation vessel at a rate of 2,400 g. per hour, while the following pre-dough components are fed to the fermentation vessel per hour:

|  | Grams |
|---|---|
| Water | 1,950 |
| Sugar | 150 |
| Malt flour | 37 |
| Salt | 74 |
| Dried milk | 148 |
|  | 2,359 |

111 g. yeast per hour, i.e. about 4.7%, are introduced additionally to said 2,359 g. of pre-dough components fed per hour into the fermentation vessel intermittently or continuously. The amounts added to the fermentation vessel per hour are thus somewhat larger than the amounts withdrawn per hour. It is necessary to add slightly more pre-dough components per hour to the vessel than is withdrawn therefrom due to the fermentation loss. The pre-dough mixture in the fermentation vessel is kept at a temperature of 30° C. while stirring.

In order to compare pre-dough obtained after continuous fermentation for six hours and for twelve hours, respectively, portions of pre-dough withdrawn per hour at such times, each amounting to 2,400 g., are mixed each with 3,700 g. of wheat flour Type 550 and 130 g. of shortening to form a bread dough. The resulting bread dough portions are then divided, without allowing them to stand for after-fermentation, into twelve pieces of the same size. These pieces are shaped and placed into dough molds. After loaf fermentation, the loaves are baked.

On testing the resulting bread, pH values of 5.7 and 5.5, respectively, are found. Elasticity of the bread and also its firmness on cutting are excellent. Aroma and the taste of the bread are full and pure.

The baked products of the invention are characterized by the pH and acidity values discussed above, by a hard and flaky crust, excellent crumb structure, excellent elasticity, splendid aroma and taste and freedom of objectionable characteristics. Evaluation was performed by the methods laid down by "Deutsche Landwirtschaftliche Gesellschaft."

pH value and acidity as given in the examples were determined according to the method described in "Brot und Gebaeck," 1957, page 102.

Of course, many changes and variations in the pre-dough ingredients, the fermentation temperature and duration, the fermentation apparatus used, the microorganisms employed, the methods of working up the fermented pre-dough and of producing bread, pastry or baker's wares therefrom, and the like may be made by those skilled in the art in accordance with the principles set forth and in the claims annexed hereto.

I claim:

1. The continuous process for making a fermenting pre-dough which is capable of being used as starting dough for making dough which comprises adding to fermenting pre-dough contained in a single container unfermented pre-dough components, and further while agitating said fermenting pre-dough and said unfermented pre-dough components, adding microorganisms free of culture medium selected from the group comprising lactic acid-forming bacteria and yeasts, repeatedly, portion-wise within every hour span throughout the course of the fermentation, maintaining the stages of fermentation within said fermenting pre-dough statistically the same throughout all units of volume of said fermenting pre-dough thus while accelerating the formation of further amounts of fermenting pre-dough from said unfermented pre-dough components, and removing fermenting pre-dough from said single container at a rate about equal to the rate at which the said unfermented pre-dough components are added to the said fermenting pre-dough.

2. The continuous process of claim 1 for making fermenting leaven which comprises adding to fermenting leaven contained in a single container unfermented leaven components, and further while agitating said fermenting leaven and said unfermented leaven components, adding lactic acid-forming microorganisms free of culture medium repeatedly, portion-wise within every hour span throughout the course of the fermentation, maintaining the stages of fermentation within said fermenting leaven statistically the same throughout all units of volume of said fermenting leaven thus while accelerating the formation of further amounts of fermenting leaven, and removing fermenting leaven from said single container at a rate about equal to the rate at which the unfermented leaven components are added to the said fermenting leaven.

3. The continuous process of claim 1 in which the addition of microorganisms is performed continuously throughout the entire course of fermentation.

4. The continuous process of claim 1 which comprises the step of initiating the fermentation of the components prior to the repeated addition of the microorganisms.

5. The continuous process of claim 1 in which the container is an undivided container.

6. The continuous process of claim 1 which comprises charging a mixture of unfermented pre-dough components and a portion of lactic acid-forming microorganisms to a single, undivided container, allowing said mixture to start fermenting by being maintained essentially without agitation, admixing to the fermenting components in said container additional unfermented predough components, admixing repeatedly within every hour span to the said fermenting components additional portions of said microorganisms during the entire course of the fermentation, maintaining the fermenting mixture homogeneous through all units of volume of said fermenting components, and separating fermenting pre-dough product comprising microorganisms from the fermenting components at a rate about equal to the rate at which the unfermented pre-dough components are admixed to said fermenting components.

7. The continuous process of claim 1 in which the yeast activity during the fermentation is kept substantially constant.

8. The continuous process of claim 1 in which the product is separated at a rate exceeding 2,000 grams per hour.

9. The continuous process of claim 1 in which the total amount of the microorganisms added is equal to A, A ranging between 0.5 and 10 and being the product of equation $a/k$, wherein $a$ is the amount of bacteria expressed in percent and $k$ equals $q/v$, wherein $q$ is the amount in grams of flour charged per hour and $v$ is the amount in grams of flour contained in the mixture of fermenting components, and wherein the amount of bacteria is based on bacteria of a dry content of 30 percent.

10. The continuous process of claim 1 wherein the total amount of lactic acid-forming bacteria is added in an amount not substantially exceeding 3 percent, based on bacteria of a dry content of 30 percent, said amount being calculated on the amount of flour processed in the fermentation.

11. The continuous process of claim 1 in which the lactic acid-forming microorganisms used are of the bacterial genus Lactobacillus.

12. The continuous process of claim 1 in which the pre-dough is a leaven comprising wheat flour and the microorganisms are lactic acid-forming bacteria which are homofermentative.

13. The continuous process of claim 1 in which the pre-dough comprises rye flour and the microorganisms are lactic acid-forming bacteria which are a mixture of homofermentative and heterofermentative bacteria, in which mixture preponderant amounts of heterofermentative bacteria are present.

14. The continuous process of claim 13 in which the temperature is maintained at at least 35° C.

15. The continuous process of claim 1 in which the microorganisms are a mixture of yeast and lactic acid-forming bacteria free of culture medium.

16. The continuous process of claim 1 in which the pre-dough is yeast fermentation starter.

17. The continuous process of claim 1 in which the pre-dough is a brew.

18. The continuous process of claim 1 in which the added unfermented pre-dough components are free of flour from cereal grain.

19. The continuous process of claim 1 in which the unfermented pre-dough components are rye flour and water.

20. The continuous process of claim 1 which comprises the additional step of preparing a dough from the pre-dough by adding thereto unfermented dough components.

21. The continuous process of claim 20 which comprises the additional step of baking said dough.

22. The continuous process of claim 3 in which different microorganisms are admixed to the fermenting components during the repeated admixing of such microorganisms.

23. The continuous process of claim 1 in which the unfermented components that are added are added free of fermented components.

24. The continuous process of claim 4 in which a first portion of the microorganism is admixed to the fermenting components at the start of the fermentation thereof, and a plurality of portions are subsequently admixed throughout the course of the fermentation.

25. The continuous process for making leaven which consists of admixing to fermenting leaven contained in a single container, unfermented leaven components, admixing repeatedly within every hour span throughout the entire course of the fermentation lactic acid-forming bacteria free of culture, maintaining the stages of fermentation within said fermenting leaven statistically homogeneous throughout all units of volume of said fermenting leaven, and separating fermenting leaven from the said fermenting leaven at a rate about equal to the rate at which the unfermented leaven components are added to the said fermenting leaven.

References Cited

UNITED STATES PATENTS

| | | | |
|---|---|---|---|
| 1,624,674 | 4/1927 | Pollak | 195—115 |
| 1,891,841 | 12/1932 | Sak. | |
| 1,894,135 | 1/1933 | Torok et al. | 99—91 |
| 2,322,940 | 6/1943 | Kirby et al. | 99—91 |
| 3,125,968 | 3/1964 | Baker | 99—90 |
| 3,216,908 | 11/1965 | Kratochvil | 99—90 |

FOREIGN PATENTS 532,980  11/1956  Canada.

(Other references on following page)

OTHER REFERENCES

Food, vol. 28, No. 332, May 1959 (pp. 165, 166), Continuous Bread Dough Processing.

Pelshenke: The Bakers Digest, April 1954 (pp. 26–28), Some Fermentative Aspects of Continuous Mixing.

Lee et al.: Cereal Chemistry, vol. 36, No. 1, January 1959 (pp. 1–4 and 9), Studies on the Brew Process of Bread Manufacture.

LIONEL M. SHAPIRO, *Primary Examiner.*